US012732467B2

(12) United States Patent
Huang et al.

(10) Patent No.: US 12,732,467 B2
(45) Date of Patent: Sep. 8, 2026

(54) CONTROL METHOD FOR CLASSIFIED TRAFFIC TRANSMISSION

(71) Applicant: MEDIATEK INC., Hsinchu City (TW)

(72) Inventors: Chi-Han Huang, Hsinchu City (TW); Shu-Min Cheng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 64 days.

(21) Appl. No.: 18/882,711

(22) Filed: Sep. 11, 2024

(65) Prior Publication Data

US 2026/0075005 A1 Mar. 12, 2026

(51) Int. Cl.
*H04L 47/34* (2022.01)
*H04L 47/2441* (2022.01)

(52) U.S. Cl.
CPC .......... *H04L 47/34* (2013.01); *H04L 47/2441* (2013.01)

(58) Field of Classification Search
CPC ............................ H04L 47/34; H04L 47/2441
USPC .......................................................... 709/238
See application file for complete search history.

(56) References Cited

U.S. PATENT DOCUMENTS 12,483,933 B2 * 11/2025 Mamidwar ........... H04W 28/06
2002/0089927 A1 * 7/2002 Fischer ................... H04W 8/04 370/428
2002/0089959 A1 * 7/2002 Fischer ................. H04W 28/10 370/338
2002/0089994 A1 * 7/2002 Leach, Jr. ........... H04L 47/2433 370/392
2007/0189245 A1 * 8/2007 Tang ................... H04W 12/125 370/338
2012/0163354 A1 * 6/2012 Stacey ................ H04W 28/065 370/338
2024/0056968 A1 * 2/2024 Ryu .................. H04W 72/1263
2024/0155675 A1 * 5/2024 Chen ................. H04W 74/0808
2025/0338171 A1 * 10/2025 Mamidwar ........... H04W 28/06

FOREIGN PATENT DOCUMENTS

EP 3809748 B1 * 10/2024 ......... H04L 61/5007
WO WO-2024186770 A1 * 9/2024 ........... H04W 76/11

* cited by examiner

*Primary Examiner* — Tauqir Hussain
(74) *Attorney, Agent, or Firm* — Winston Hsu

(57) ABSTRACT

The present invention provides a control method of a wireless communication module, which includes the steps of: obtaining a plurality of MPDUs; performing a sequence number assignment for the each of the plurality of MPDUs, and sequentially enqueuing the plurality of MPDUs into a queue based on their sequence numbers, wherein at least one specific sequence number is reserved for a specific type of MPDU; and sequentially aggregates the plurality of MPDUs in the queue to generate a PPDU.

12 Claims, 5 Drawing Sheets

Enqueue Sequence
Packet Enqueue Sequence
300
310
320
1
2
3
4
6
n
5

CONTROL METHOD FOR CLASSIFIED TRAFFIC TRANSMISSION

BACKGROUND

In a current wireless communication module, a receiver address/traffic identifier (RA/TID) queue is not flow-based, and one queue may contain multiple types of traffic streams, wherein each traffic stream may have different reliability and latency requirements. For example, a plurality of media access control protocol data units (MPDUs) included within a physical layer protocol data unit (PPDU) may comprise latency-sensitive traffic and non-latency-sensitive traffic, wherein the non-latency-sensitive traffic may comprise file transfer traffic streams, and the latency-sensitive traffic may comprises live video traffic streams, Voice over Internet Protocol (VoIP), gaming control signals, etc.

In addition, the MPDUs are sequentially enqueued and assigned sequence numbers (SN) and packet numbers (PN), then the MPDUs are aggregated to generate a PPDU based on their sequence numbers. However, if there is a lot of non-latency-sensitive MPDUs in the queue, the latency-sensitive MPDU will have a higher probability of having a larger sequence number, thus affecting the transmission latency of this latency-sensitive MPDU. In particular, if the latency-sensitive MPDU is assigned to have a sequence number outside the current transmission block-acknowledgement (BA) window, and a transmission failure occurs on the MPDU(s) within the current transmission BA window, the transmission latency of the latency-sensitive MPDU will be more serious.

SUMMARY

It is therefore an objective of the present invention to provide a control method of a wireless communication module, which reserves some sequence numbers for the latency-sensitive traffic, to solve the above-mentioned problems.

According to one embodiment of the present invention, a control method of a wireless communication module comprises the steps of: obtaining a plurality of MPDUs; performing a sequence number assignment for the each of the plurality of MPDUs, and sequentially enqueuing the plurality of MPDUs into a queue based on their sequence numbers, wherein at least one specific sequence number is reserved for a specific type of MPDU; and sequentially aggregates the plurality of MPDUs in the queue to generate a PPDU.

According to one embodiment of the present invention, a wireless communication module of an electronic device is configured to perform the steps of: obtaining a plurality of MPDUs; performing a sequence number assignment for the each of the plurality of MPDUs, and sequentially enqueuing the plurality of MPDUs into a queue based on their sequence numbers, wherein at least one specific sequence number is reserved for a specific type of MPDU; and sequentially aggregates the plurality of MPDUs in the queue to generate a PPDU.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
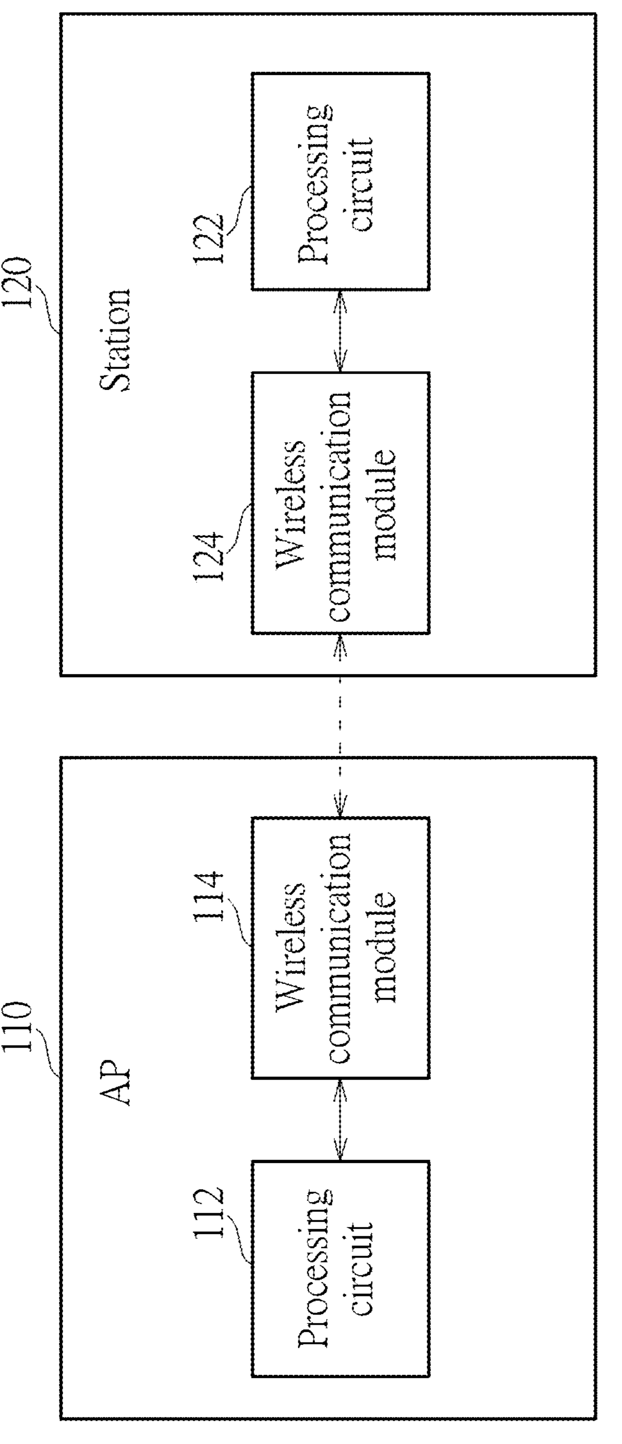
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an access point (AP) 110 and at least one station such as 120. The AP 110 is a Wi-Fi access point (AP) that allows other wireless devices such as the station 120 to connect to a wired network, and the AP 110 mainly comprises a processing circuit 112 and a wireless communication module 114. The station 120 is a Wi-Fi station comprising a processing circuit 122 and a wireless communication module 124, and the station 120 can be a cell phone, a tablet, a notebook, or any other electronic device capable of wirelessly communicating with the AP 110. In addition, the wireless communication module 114/124 comprises at least a media address control (MAC) layer circuitry and physical layer circuitry.

Figure 2:
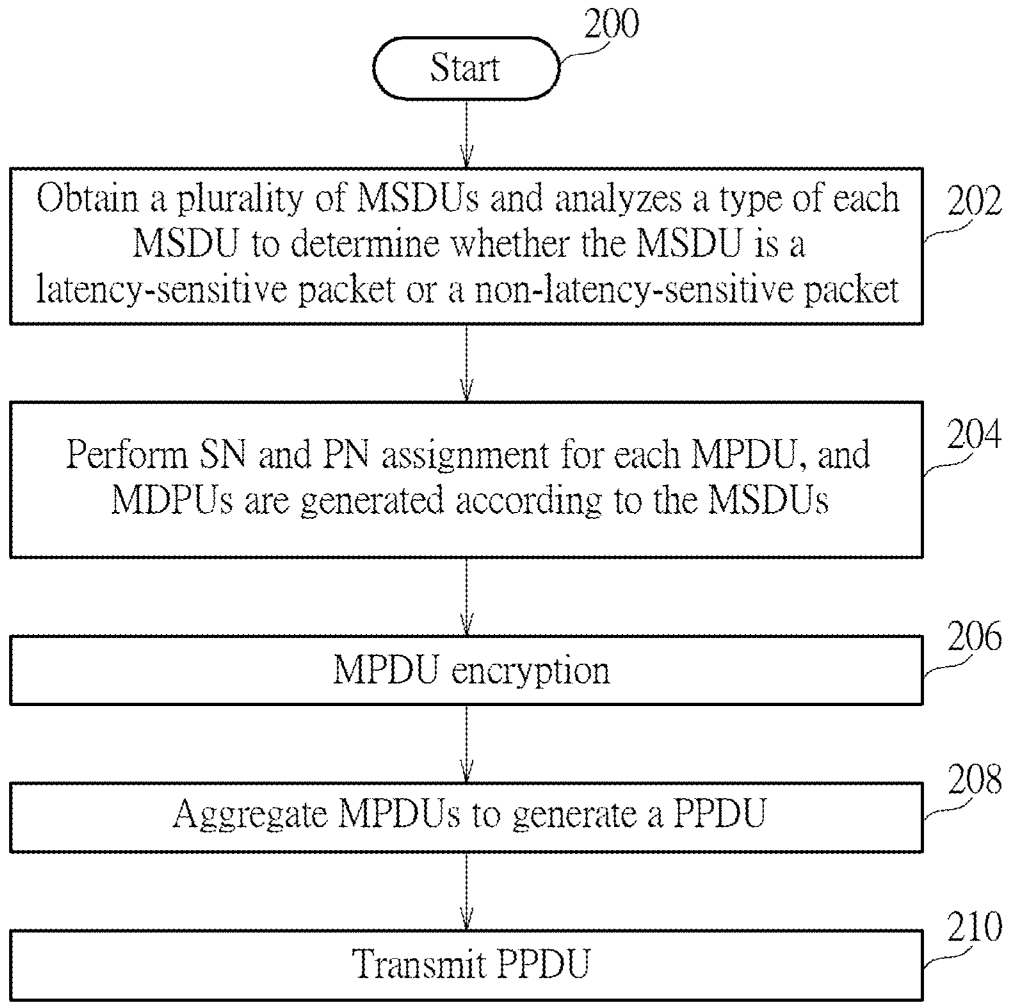
FIG. 2 is a control method of a wireless communication module according to one embodiment of the present invention.

FIG. 2 is a control method of one of the wireless communication modules 114 and 124 according to one embodiment of the present invention. In the following description, the wireless communication module 114 serves as an example to perform the following steps, but the present invention is not limited thereto. In Step 200, the flow starts, and the AP 110 and the station 120 have established one or more links. In Step 202, the wireless communication module 114 obtains a plurality of MAC service data units (MSDUs) and the wireless communication module 114 analyzes a type of each MSDU to determine whether the MSDU is a latency-sensitive packet or a non-latency-sensitive packet. For example, the latency-sensitive packets may correspond to VoIP signaling and data packet, gaming control and data packet, multimedia conferencing packet, real-time interactive packet, high priority packet, etc., and the non-latency-sensitive packets may correspond to a file transfer protocol (FTP) packet or a browser control and data packet.

In Step 204, the wireless communication module 114 performs sequence number (SN) and packet number (PN) assignment for each MPDU, wherein MDPUs are generated according to the MSDUs, and one MPDU may comprise one or more MSDUs. In this embodiment, the MSDUs also classified as latency-sensitive MPDUs and non-latencysensitive MPDUs, wherein the latency-sensitive MPDU comprises one or more latency-sensitive MSDUs, and the non-latency-sensitive MPDUs comprises one or more non-latency-sensitive MSDUs. In addition, the MPDUs are enqueued into a RA/TID queue, and all the MPDUs share the same SN space. In this embodiment, in order to reduce the probability of latency-sensitive MPDU being assigned with a higher sequence number, the wireless communication module 114 reserves part of the sequence numbers for a specific type of MPDU, wherein the specific type of MPDU is the latency-sensitive MPDU. Specifically, the wireless communication module 114 may assign a single sub-queue of the RA/TID queue for storing the multiple classified MPDUs such as the latency-sensitive MPDUs and the non-latency-sensitive MPDUs, or the wireless communication module 114 may assign multiple sun-queues in the RA/TIA queue for storing the multiple classified MPDUs, respectively. In addition, the wireless communication module 114 statically or dynamically reserves some sequence numbers for the each sub-queue in a moving transmission (TX) BA window, for example, five sequence numbers are reserved in a BA window size of "256" for the traffic on the PPDU.

In one embodiment, the sequence number reservation mechanism can be determined based on the type of the latency-sensitive MPDUs. For example, if the latency-sensitive MPDUs belong to periodic latency-sensitive traffic such as VoIP or live video stream, the wireless communication module 114 may dynamically reserve some sequence numbers for the each sub-queue (e.g., the distance between the two adjacent reserved sequence numbers may be changed, or a number of MSDUs within one MPDU may be changed). If the latency-sensitive MPDUs belong to event-based latency-sensitive traffic such as gaming control and data packet, the wireless communication module 114 may statically reserve some sequence numbers for the each sub-queue because the event-based latency-sensitive traffic usually has less amount of traffic (e.g., the reserved sequence numbers may evenly distributed in the queue).

Figure 3:
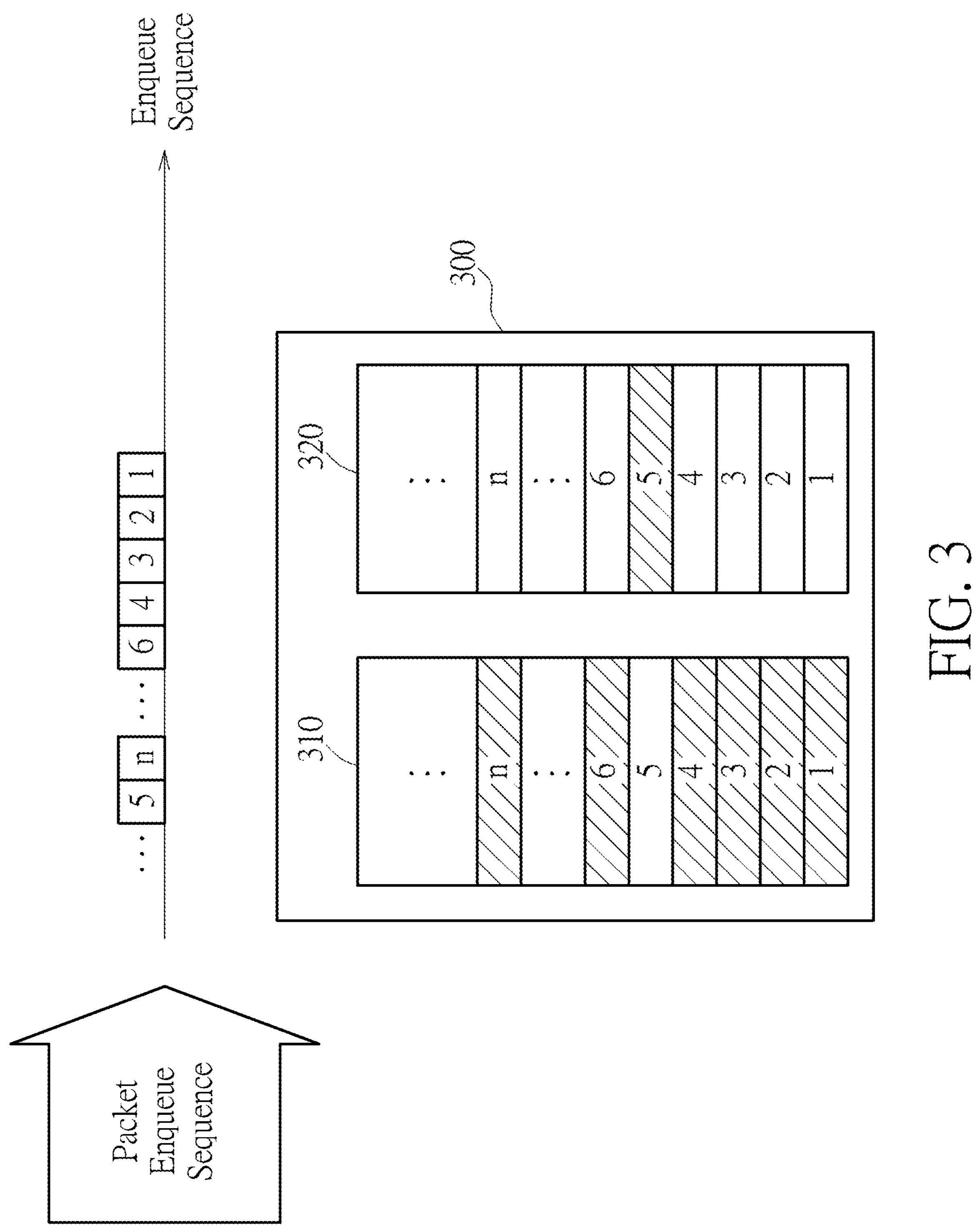
FIG. 3 is a diagram of enqueuing the MPDUs according to one embodiment of the present invention.

FIG. 3 is a diagram of enqueuing the MPDUs according to one embodiment of the present invention. As shown in FIG. 3, the RA/TID queue 300 has two sub-queues 310 and 320, wherein the sub-queue 310 is configured to store the non-latency-sensitive MPDUs, and the sub-queue 320 is configured to store the latency-sensitive MPDUs, and the sequence number #5 is reserved for the latency-sensitive MPDU. In the operation of the example shown in FIG. 3, the initially generated MPDUs are non-latency-sensitive, these non-latency-sensitive MPDUs are sequentially assigned the sequence numbers #1-#n except #5, and the non-latency-sensitive MPDUs with the sequence numbers #1-#4 and #6-#n are enqueued in the sub-queue 310. Then, after the non-latency-sensitive MPDU with the sequence number #n, the wireless communication module 114 determines if the next MPDU belongs to the latency-sensitive traffic to determine how to assign the sequence number for this MPDU. If the MPDU belongs to the latency-sensitive traffic, the wireless communication module 114 assigns the sequence number #5 to this latency-sensitive MPDU to make the latency-sensitive MPDU have a chance to be transmitted in an earlier PPDU. If the MPDU does not belong to the latency-sensitive traffic, the wireless communication module 114 assigns the sequence number #(n+1), which is following the previous sequence number #n, to this non-latency-sensitive MPDU. FIG. 3 shows that the next MPDU is the latency-sensitive MPDU with the sequence number #5.

In the embodiment shown in FIG. 3, the sub-queues 310 and 320 are used to store the non-latency-sensitive MPDUs and the latency-sensitive MPDUs, respectively, however, the present invention is not limited to this. In another embodiment, the RA/TID queue 300 may use only one sub-queue to store the non-latency-sensitive MPDUs and the latency-sensitive MPDUs.

In Step 206, an encryption operation is performed on the MPDUs. In Step 208, a MAC layer circuit within the wireless communication module 114 aggregates a plurality of MPDUs to generate a PPDU. In Step 210, the wireless communication module 114 transmits the PPDU to the station 120.

Figure 4:
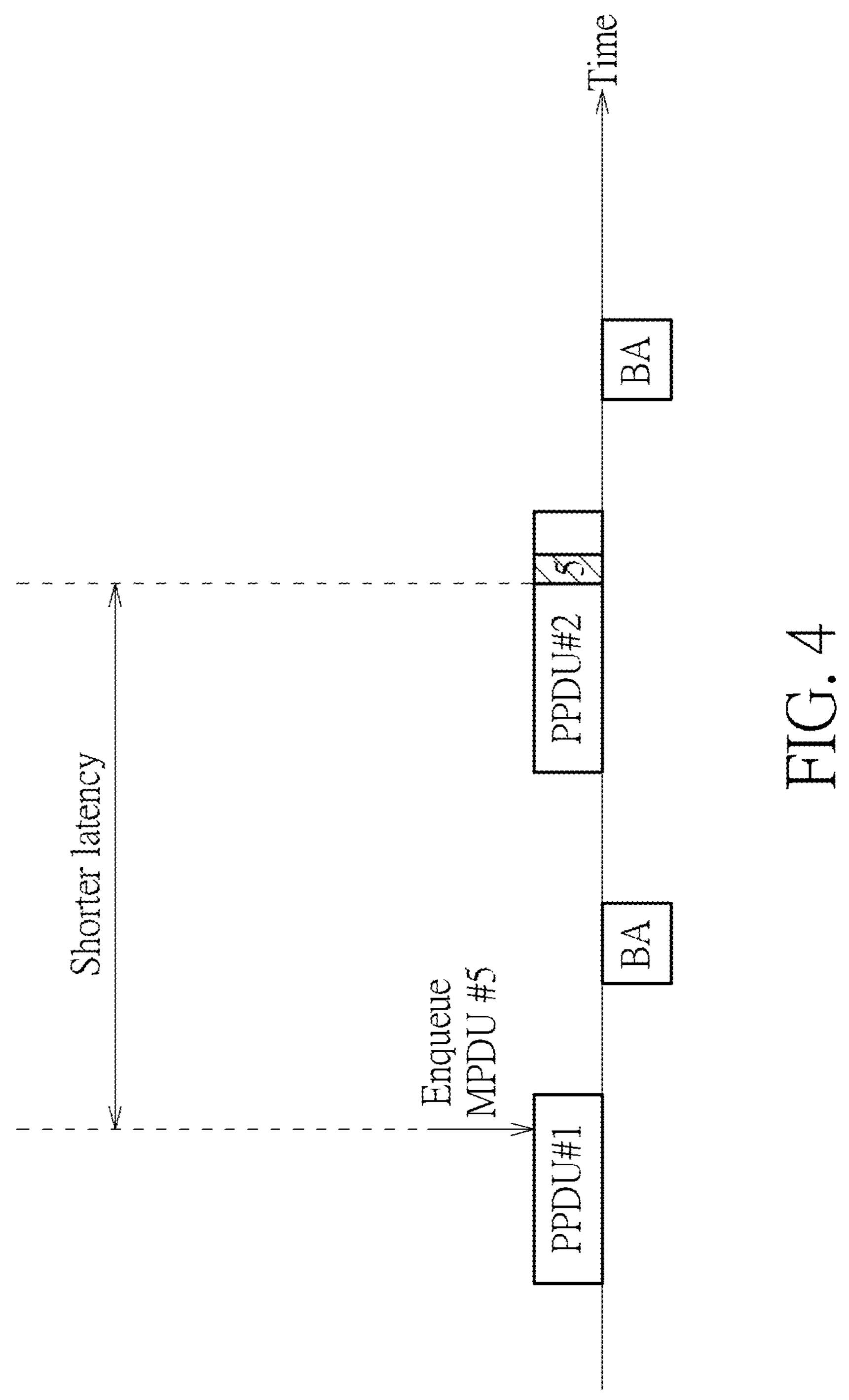
FIG. 4 shows the MPDU aggregation of the embodiment shown in FIG. 3.

Referring to FIG. 4, which shows the MPDU aggregation of the embodiment shown in FIG. 3, the MPDUs in the RA/TID queue 300 are sequentially aggregated to generate a first PPDU, and the first PPDU is transmitted to the station 120. In this embodiment, the latency-sensitive MPDU with the sequence number #5 is enqueued when the first PPDU is transmitted. After the station 120 successfully receives the first PPDU, the station 120 sends a BA to the AP 110. Then, because the latency-sensitive MPDU is assigned with the smaller sequence number #5 (earlier sequence number), the latency-sensitive MPDU can be aggregated into a second PPDU following the first PPDU, so that the latency-sensitive MPDU can transmitted to the station 120 earlier.

In the embodiment shown in FIG. 3 and FIG. 4, by reserving some sequence numbers for the latency-sensitive MPDUs in the RA/TID queue, the latency-sensitive MPDUs generated later may be assigned to have earlier sequence numbers, so that these latency-sensitive MPDUs have the opportunity to be aggregated into PPDUs transmitted earlier, to lower the transmission latency of the latency-sensitive MPDUs.

Figure 5:
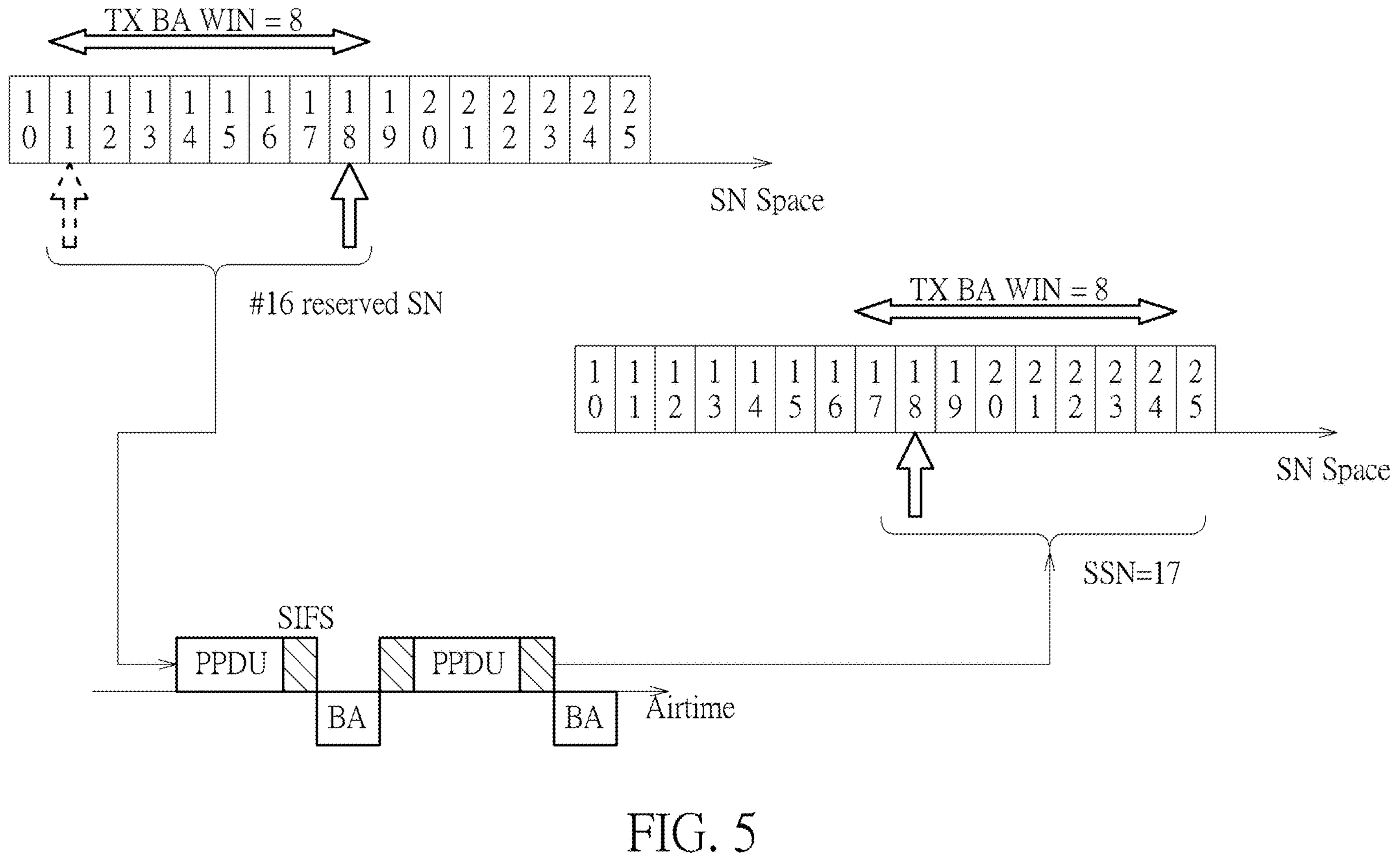
FIG. 5 is a diagram illustrating when to use a BAR to move the BA window according to one embodiment of the present invention.

In addition, if no latency-sensitive MPDU is generated for a period of time, the reserved sequence number may not be used so that the BA window is bounded due to this missed sequence number. To solve this problem, the wireless communication module 114 sends a block acknowledgement request (BAR) to the station 120 after receiving the BA indicating that the MPDU of the reserved sequence number is not successfully received, to move the BA window. FIG. 5 is a diagram illustrating a control method of the wireless communication module 114 according to one embodiment of the present invention, wherein it is assumed that the BA window size is "8", the sequence number #16 is reserved for the latency-sensitive MPDU, and there is no latency-sensitive MPDU. In the embodiment shown in FIG. 5, the wireless communication module 114 aggregates the MPDUs with the sequence numbers #11-#18 to generate a PPDU, wherein the PPDU does not have the MPDU with the sequence umbers #16 or the MPDU with the sequence umber #16 is null data or invalid data because there is no latency-sensitive MPDU. Then, the station 120 receives the PPDU and transmits a BA to the AP 110, wherein the BA comprises the acknowledgments of the MPDU with the sequence numbers #11-#18 except #16 because the MPDU with the sequence number #16 was not successfully received. Then, to solve the problem that the BA window is bounded because the AP 110 did not receive the acknowledgment of the MPDU with the sequence number #16, the wireless communication module 114 sends the BAR to trigger the station 120 to move the BA window so that the start sequence number (SSN) is greater than #16, such as SSN=17 shown in FIG. 5, then the station 120 sends the BA to confirm the BAR. Therefore, after the BA window is moved, the wireless communication module 114 can perform the operations shown in FIG. 3 and FIG. 4 to generate and transmit the PPDUs.

It is noted that the information and operation of the BAR is mentioned in specification of 802.11 and is known by a person skilled in the art, so further descriptions about the BAR is omitted here.

In one embodiment, since the number of the latency-sensitive MPDUs is not stable, in order to avoid affecting the utilization of the RA/TID queue 300, the number/ratio of reserved sequence numbers in the RA/TID queue 300 will not be set too high. In this case, if the number of latency-sensitive MPDUs suddenly increases for a period of time, the transmission latency of the latency-sensitive MPDUs may not be improved through the embodiments of FIG. 3 and FIG. 4 due to insufficient reserved sequence numbers. To solve this problem, the wireless communication module 114 can dynamically adjust the number of the latency-sensitive MSDUs aggregated within one MPDU. In one embodiment, if the number of the latency-sensitive MSDUs to be transmitted is less than or equal to a threshold value, wherein the threshold value may be equal to a product of the number of reserved sequence numbers within a BA window and a predetermined number of the MSDUs aggregated within one MPDU, the wireless communication module 114 uses the predetermined setting to aggregate the latency-sensitive MSDUs into the MPDU, for example, the number of latency-sensitive MSDUs contained in each MPDU is the same. If the number of the latency-sensitive MSDUs to be transmitted is greater than the threshold, the wireless communication module 114 increases the number of latency-sensitive MSDUs contained in each MPDU, so that the MPDUs with the reserved sequence numbers can include all the latency-sensitive MSDUs to be transmitted.

Briefly summarized, in the control method of the wireless communication module of the present invention, by reserving some sequence numbers for the latency-sensitive MPDUs in the RA/TID queue, the latency-sensitive MPDUs generated later may be assigned to have earlier sequence numbers, so that these latency-sensitive MPDUs have the opportunity to be aggregated into PPDUs transmitted earlier, to lower the transmission latency of the latency-sensitive MPDUs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a wireless communication module, comprising:

obtaining a plurality of media access control protocol data units (MPDUs);

performing a sequence number assignment for the each of the plurality of MPDUs, and sequentially enqueuing the plurality of MPDUs into a queue based on their sequence numbers, wherein at least one specific sequence number is reserved for a specific type of MPDU; and sequentially aggregating the plurality of MPDUs in the queue to generate a physical layer protocol data unit (PPDU);

wherein the plurality of the MPDUs comprise a plurality of non-latency-sensitive MPDUs and at least one latency-sensitive MPDU, and the at least one specific sequence number is reserved for the latency-sensitive MPDU; and when performing the sequence number assignment for the plurality of non-latency-sensitive MPDUs, the at least one specific sequence number is skipped.

2. The control method of claim 1, wherein the step of performing the sequence number assignment for the each of the plurality of MPDUs comprises:

initially assigning the plurality of non-latency-sensitive MPDUs to have a plurality of sequence numbers except the at least one specific sequence number; and assigning the at least one latency-sensitive MPDU to have the at least one specific sequence number.

3. The control method of claim 1, wherein the step of performing the sequence number assignment for the each of the plurality of MPDUs comprises:

for each of the plurality of MPDUs, determining if the MPDU belongs to the latency-sensitive MPDU;

if the MPDU belongs to the latency-sensitive MPDU, assigning the MPDU to have the specific sequence number; and if the MPDU belongs to the non-latency-sensitive MPDU, assigning the MPDU to have the sequence number following the previous sequence number.

4. The control method of claim 1, further comprising:

dynamically adjusting a number of latency-sensitive MSDUs aggregated within one latency-sensitive MPDU.

5. The control method of claim 4, wherein the step of dynamically adjusting a number of the latency-sensitive MSDUs aggregated within one latency-sensitive MPDU comprises:

adjusting the number of latency-sensitive MSDUs aggregated within one latency-sensitive MPDU so that the MPDU(s) with the specific sequence numbers comprises all the latency-sensitive MSDUs to be transmitted within a block acknowledgement window.

6. A control method of a wireless communication module, comprising:

obtaining a plurality of media access control protocol data units (MPDUs);

performing a sequence number assignment for the each of the plurality of MPDUs, and sequentially enqueuing the plurality of MPDUs into a queue based on their sequence numbers, wherein at least one specific sequence number is reserved for a specific type of MPDU;

sequentially aggregating the plurality of MPDUs in the queue to generate a physical layer protocol data unit (PPDU);

wirelessly transmitting the PPDU to an electronic device;

receiving a block acknowledgement in response to the PPDU from the electronic device; and if the PPDU comprises the at least one specific sequence number, and the block acknowledgement indicates that the MPDU of the specific sequence number is not successfully received, sending a block acknowledgement request to trigger the station to move a block acknowledgement window so that a start sequence number of the block acknowledgement window is greater than the specific sequence number.

7. A wireless communication module of an electronic device, configured to perform the steps of:

obtaining a plurality of media access control protocol data units (MPDUs);

performing a sequence number assignment for the each of the plurality of MPDUs, and sequentially enqueuing the plurality of MPDUs into a queue based on their sequence numbers, wherein at least one specific sequence number is reserved for a specific type of MPDU; and sequentially aggregating the plurality of MPDUs in the queue to generate a physical layer protocol data unit (PPDU);

wherein the plurality of the MPDUs comprise a plurality of non-latency-sensitive MPDUs and at least one latency-sensitive MPDU, and the at least one specific sequence number is reserved for the latency-sensitive MPDU; and when performing the sequence number assignment for the plurality of non-latency-sensitive MPDUs, the at least one specific sequence number is skipped.

8. The wireless communication module of claim 7, wherein the step of performing the sequence number assignment for the each of the plurality of MPDUs comprises:

initially assigning the plurality of non-latency-sensitive MPDUs to have a plurality of sequence numbers except the at least one specific sequence number; and assigning the at least one latency-sensitive MPDU to have the at least one specific sequence number.

9. The wireless communication module of claim 7, wherein the step of performing the sequence number assignment for the each of the plurality of MPDUs comprises:

for each of the plurality of MPDUs, determining if the MPDU belongs to the latency-sensitive MPDU;

if the MPDU belongs to the latency-sensitive MPDU, assigning the MPDU to have the specific sequence number; and if the MPDU belongs to the non-latency-sensitive MPDU, assigning the MPDU to have the sequence number following the previous sequence number.

10. The wireless communication module of claim 7, further comprising:

dynamically adjusting a number of latency-sensitive MSDUs aggregated within one latency-sensitive MPDU.

11. The wireless communication module of claim 10, wherein the step of dynamically adjusting a number of the latency-sensitive MSDUs aggregated within one latency-sensitive MPDU comprises:

adjusting the number of latency-sensitive MSDUs aggregated within one latency-sensitive MPDU so that the MPDU(s) with the specific sequence numbers comprises all the latency-sensitive MSDUs to be transmitted within a block acknowledgement window.

12. A wireless communication module of an electronic device, configured to perform the steps of:

obtaining a plurality of media access control protocol data units (MPDUs);

performing a sequence number assignment for the each of the plurality of MPDUs, and sequentially enqueuing the plurality of MPDUs into a queue based on their sequence numbers, wherein at least one specific sequence number is reserved for a specific type of MPDU;

sequentially aggregating the plurality of MPDUs in the queue to generate a physical layer protocol data unit (PPDU);

wirelessly transmitting the PPDU to an electronic device;

receiving a block acknowledgement in response to the PPDU from the electronic device; and if the PPDU comprises the at least one specific sequence number, and the block acknowledgement indicates that the MPDU of the specific sequence number is not successfully received, sending a block acknowledgement request to trigger the station to move a block acknowledgement window so that a start sequence number of the block acknowledgement window is greater than the specific sequence number.

* * * * *